(12) United States Patent
Deguchi et al.

(10) Patent No.: US 6,704,155 B2
(45) Date of Patent: Mar. 9, 2004

(54) TAPE STOPPING MECHANISM

(75) Inventors: Takehiko Deguchi, Takefu (JP); Fumio Kinoshita, Takefu (JP)

(73) Assignee: Orion Electric Co., Ltd., Fukui (JP)

( * ) Notice: Subject to any disclaimer, the term of this patent is extended or adjusted under 35 U.S.C. 154(b) by 456 days.

(21) Appl. No.: 09/860,614

(22) Filed: May 21, 2001

(65) Prior Publication Data

US 2002/0006008 A1 Jan. 17, 2002

(30) Foreign Application Priority Data

May 19, 2000 (JP) ........................................ 2000-147209

(51) Int. Cl.[7] ................................................ G11B 15/46
(52) U.S. Cl. .................. 360/73.04; 360/74.1; 360/74.2; 360/73.05
(58) Field of Search .............................. 360/73.04, 74.2, 360/73.05, 74.1

(56) References Cited

U.S. PATENT DOCUMENTS

| 4,754,347 A | * | 6/1988 | Kodama | ........................ 360/85 |
| 6,542,323 B1 | * | 4/2003 | Akitaya | ................... 360/73.04 |

* cited by examiner

*Primary Examiner*—David Hudspeth
*Assistant Examiner*—Mitchell Slavitt
(74) *Attorney, Agent, or Firm*—Wenderoth, Lind & Ponack L.L.P.

(57) ABSTRACT

In a high-speed tape winding operation of a magnetic recording and reproducing apparatus, stable tape-stopping operation without generating any damages of the tape. In addition to the mechanical braking means, a reverse braking force is applied to a drive motor for rotating reels depending on the tape conditions so as to diminish the rotation inertia of the drive motor and dispense with a strict operation timing and precision of the mechanical braking means.

8 Claims, 4 Drawing Sheets

TAPE STOPPING MECHANISM

BACKGROUND OF THE INVENTION

1. Field of the Invention

This invention relates to a magnetic recording and/or reproducing apparatus such as a video tape recorder, and more particularly to an improvement of a tape stopping mechanism in a fast-forward running mode or a rewinding running mode at a high speed.

2. Prior Art

In a magnetic recording and/or reproducing apparatus such as a video tape recorder, it is occasionally required to stop tape reels during a fast-forward running or a rewinding running of a tape. In accordance with recent high-speed tape running in a fast-forward running mode or a rewinding running mode, it becomes important to stop tape-running safely without causing slack and/or damage of a tape.

In a conventional magnetic recording and/or reproducing apparatus winding a tape at a comparatively low speed in a fast-forward running mode or a rewinding running mode, a tape stop operation is performed during a fast-forward running and a rewinding running by turning off an electric source of a drive motor and applying a strong braking force to two reels simultaneously and quickly by means of a mechanical braking means.

Such braking force is applied to each reel mechanically by shifting a position of a mechanical braking means provided on each reel and the braking properties thereof are not affected by a tape position, a direction of a tape running, and a rotation number of a capstan motor, so that a constant braking force is applied to reels.

When a rapid braking operation is performed only by the aforementioned mechanical braking means during a high-speed tape running in a fast-forward running mode or a rewinding running mode, there occur such problems that an abnormal tension is applied to a tape and/or a running tape protrudes from a predetermined running path into an inside of an apparatus due to a slight timing difference of a braking operation applied to a supply reel and a take-up reel. In order to solve the above problems, there has been proposed an improved braking mechanism having different properties depending on the rotating direction of a respective reel. For example, there has been provided a braking mechanism whereby a tape winding is so controlled that a winding amount of a take-up reel is larger than a supply amount of a supply reel by applying a strong braking force to a supply reel and applying a weak braking force to a take-up reel.

In recent high-speed tape running in a fast-forward running mode or a rewinding running mode, a rotation number of a drive motor for rotating a reel is increased and thereby a rotational inertia of the drive motor is also increased. Accordingly, when a tape stop operation is performed by turning off an electric source of a drive motor and applying a mechanical braking force during a high-speed winding mode, a take-up reel connected to a drive motor by means of a transferring mechanism such as an idler gear continues to rotate in a tape winding direction by a great rotational inertia of a drive motor, thereby applying an abnormal tension to a tape. In order to solve such problems, there has been proposed a tape stopping apparatus, in which a reverse braking force is generated by applying a rotational force to a drive motor in a direction reverse to a current rotational direction and applying a braking force to a supply reel connected to a transferring mechanism such as an idler gear. Said reverse braking force is applied to a drive motor in approximately three different manners depending on a tape position.

Said reverse braking force, however, is constant in each braking manner, so that the rotation of a take-up reel caused by a rotation inertia occasionally exceeds the rotation of an idler gear when the rotation of a drive motor is rapidly reduced. In such a case, there occurs an improper engagement of an idler gear with a gear formed on a take-up reel base, thereby causing a so-called "idler squeaking" phenomena, namely a squeaking trouble between an idler gear and a take-up reel base gear.

It is therefore an object of the present invention to provide a safe tape stopping mechanism eliminating the above-mentioned problems such as "idler squeaking" caused by a rotation inertia of a take-up reel, tape protrusion caused by a rapid braking operation and a tape damage caused by an abnormal tension applied thereto.

SUMMARY OF THE INVENTION

The inventors have made various investigations in order to solve the above problems and found that such problems can be eliminated by employing a tape stopping mechanism wherein a braking force is applied to a supply reel and a take-up reel by means of a mechanical braking means and also by applying an reverse braking force of a drive motor in accordance with the rotation number of a drive motor in such a manner that the lower the rotation number of a drive motor is, the smaller the reverse braking force is.

The reverse braking force is decided in accordance with the braking force of a mechanical braking means. In addition thereto, it is preferable that the reverse braking force is decided so as to be in inverse proportion to a total tape area. Namely, in the case of a tape having a large total area, the ratio of a tape area of a take-up reel to that of a supply reel becomes large at the beginning of tape winding or at the end of tape winding, so that the rotational inertia of a supply reel is increased when a fast-forward running is stopped at the beginning of tape winding or a rewinding running is stopped at the end of tape winding. Accordingly, when a strong reverse braking is applied, a take-up reel is immediately stopped and there occurs a tape protrusion out of a supply reel. On the contrary, in the case of a tape having a small total area, a supply reel is stopped earlier than a take-up reel, so that it is necessary to stop the take-up reel earlier by applying a strong reverse braking so as to prevent tape damages.

Accordingly, it is preferable that the reverse braking force is applied so as to be in inverse proportion to a total tape area, so that the reverse braking force is weakly applied to a tape having a large total area and strongly applied to a tape having a small total area, thereby preventing the protrusion of a tape and tape damages caused by the rotational inertia of reels. The total tape area may be calculated by detecting the rotation number of the supply reel and the take-up reel respectively using a reel rotation detecting means. The reverse braking force may be controlled so as to be reduced in proportion to the reduction of the rotation number of a drive motor, thereby reducing the reverse braking force at the beginning of tape wining and the end of tape winding and preventing the occurrence of squeaking. The reverse braking force may be reduced either by a proportional control in response to the rotation number of the drive motor or by a stepwise control. In the case of the stepwise control, the reverse braking force may be set to have three stages from a first stage to a third stage depending on the rotation number of the drive motor. The drive motor is controlled by applying a reverse braking force in response to the rotation number of the drive motor detected by a rotation detecting means and also controlled by applying a reverse braking force reduced stepwise in proportion to the reduction of the rotation of the drive motor. The rotation number of the drive motor may be detected by using a frequency generator (FG) which generates a frequency signal depending on the rotation number of the drive motor.

For deciding the reverse braking force, it is preferred that the tape area of a take-up reel and the rotation number of the drive motor is taken into account so as to apply the reverse braking force depending on the rotational inertia of reels. The reverse braking is for preventing the rotation inertia of the take-up reel, so that the reverse braking force should be increased in proportion to the increase of the rotational inertia of the take-up reel. In general, an inertia is in proportion to the product of a weight and the square of a speed. Assuming that a weight is a tape area of the take-up reel and a speed is the rotation number of a drive motor, the reverse braking force applied in proportion to the tape area of the take-up reel and the rotation number of the drive motor can be matched the rotational inertia of a drive motor. The tape area is calculated by detecting the rotation number of the supply reel and the take-up reel respectively using a reel rotation detecting means as in the case of detecting the total tape area.

Furthermore, when the reverse braking force is so controlled to be reduced at the beginning of the tape winding or the end of the tape winding by detecting a total tape area and a tape area of the take-up reel and calculating the ratio of the tape area to the total tape area, tape damages can be effectively prevented.

DETAILED DESCRIPTION OF THE EMBODIMENTS

Figure 1:
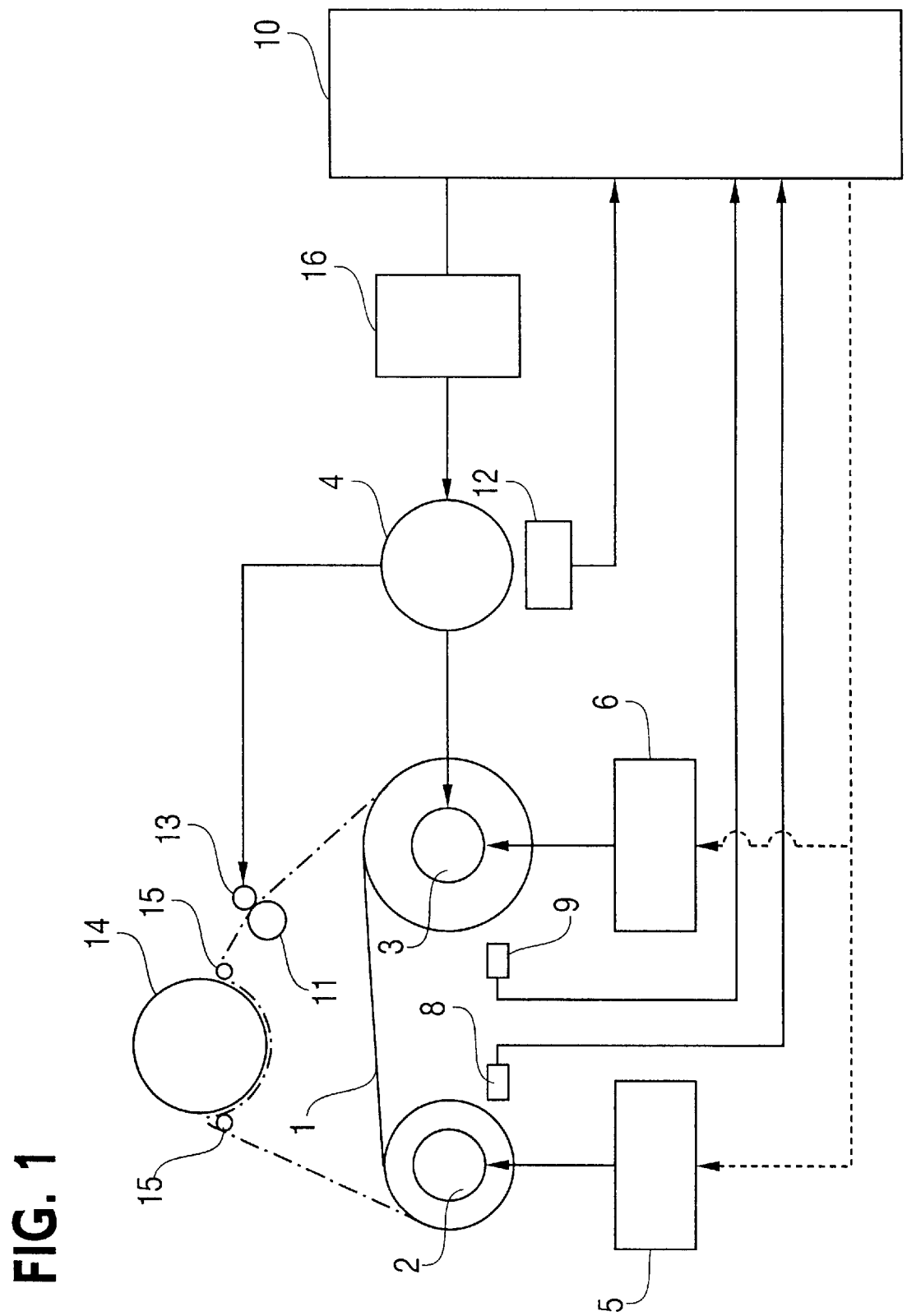
FIG. 1 is a schematic layout of one embodiment of a tape stopping mechanism according to the present invention.

Preferred embodiments of the present invention will be explained with reference to the accompanying drawings. FIG. 1 is a schematic layout of a magnetic recording and reproducing apparatus provided with a tape stopping mechanism according to the present invention. The magnetic recording and reproducing apparatus shown in FIG. 1 is of a well known construction having a supply reel 2 supplying a tape 1, a take-up reel 3 winding the tape, and a drive motor 4 rotatably driving each of the reels 2 and 3. A driving force of a high torque is transmitted from the drive motor 4 selectively to each of the reel 2 and the reel 3, depending on the tape running direction, by means of a clutch mechanism and a transmitting mechanism such as a pulley, a belt and the like, so as to wind a tape at a high speed. A driving force is transmitted selectively to the supply reel 2 or the take-up reel 3 by means of a clutch mechanism depending on a fast-forward running mode or a rewinding running mode. Each of the reels 2, 3 is provided with a well-known mechanical braking means 5 and 6 including a brake band, respectively, which applies a braking force to said reels 2 and 3 simultaneously at the time of tape stopping. Each of the reels 2 and 3 is provided with a reel rotation detecting means 8 and 9 respectively which detects the rotation number of the respective reel. Said reel rotation detecting means 8 and 9 comprises a rotation sensor, such as a light sensor and the like, which generates pulses in response to the rotation of the reel 2 and 3. The rotation number of each of the reels 2 and 3 is determined by counting reel pulses generated. For example, one rotation of each reel generates 6 pulses. Said pulses are inputted into a controller 10, and a tape area of each reel and a total tape area are calculated by counting said pulses.

The driving force of the drive motor 4 is transmitted to a capstan 11 and the drive motor works as a capstan motor. The rotation number of the drive motor 4 is detected by a rotation detecting means 12 and a detected signal is inputted into the controller 10. Said rotation detecting means 12 comprises, for example, a frequency generator (FG) which generates a frequency signal depending on the rotation number of the drive motor 4.

A driving mechanism is provided to drive a pinch roller 13 so that the pinch roller is pressed against or detached from the capstan 11 and the tape 1 sandwiched between the pinch roller 13 and the capstan 11 is transported at a constant speed. A reference numeral 14 is a cylinder and a numeral 15 is a guide pin.

The controller 10 comprising a microcomputer controls the drive motor 4 via a motor driver 16 so as to rotate the drive motor at a predetermined rotation number in compliance with a tape running mode such as a reproducing mode, a recording mode, a fast-forward reproducing mode, a rewinding reproducing mode, a fast-forward running mode, and a rewinding running mode a running mode. The controller 10 also controls the drive motor 4 by supplying a reverse voltage to apply a reverse braking force.

During the tape running in a fast-forward running mode or a rewinding running mode, the drive motor 4 rotates at a high speed in order to transport the tape 1 at a high speed, while a reverse braking force is being applied to the drive motor 4.

The control operation in the fast-forward running mode and a rewinding running mode and the tape stopping mechanism during said running modes will now be explained in the following.

Figure 2:
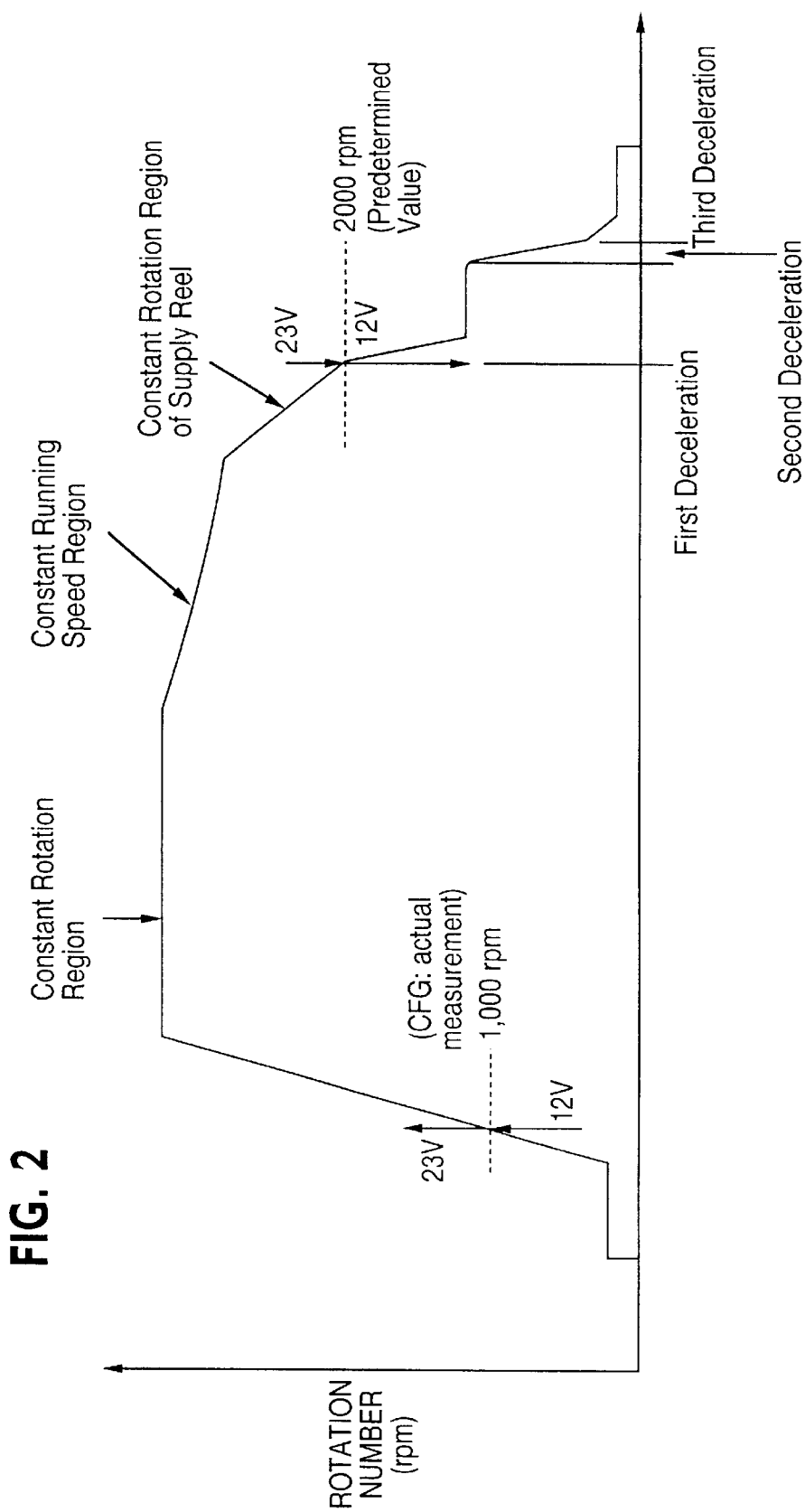
FIG. 2 is a chart showing the timing of the acceleration and deceleration of a capstan motor during a tape running at a high speed.

FIG. 2 is a timing chart in which the rotation number of the drive motor 4 at a high speed tape winding is expressed on the ordinate and the period of the rotation of the drive motor 4 is expressed on the abscissa, respectively. As apparent from FIG. 2, the control operation of the controller 10 is performed as follows. By depressing a command key for starting a high-speed tape winding, the drive motor 4 supplied a low voltage rotates approximately at a constant speed at the initial period of tape winding. During the tape running at a constant speed, the total tape area is calculated from the rotation number of the reels 2 and 3, and subsequently the tape area of each of the reels is calculated to determine the best acceleration conditions and the best deceleration points depending on the tape winding conditions. Then, the drive motor 4 is accelerated.

When the rotation number of the drive motor 4 exceeds a predetermined value (for example, 1,000 rpm), the output voltage applied to the drive motor 4 is switched to a high voltage (for example, 23V) so as to increase the rotation number of the drive motor 4. In such a manner, the tape running speed is accelerated gradually. When the rotation number of the drive motor 4 reaches the maximum rotation number, the drive motor 4 is controlled so as to rotate at a predetermined constant speed maintaining the maximum rotation number to rewind the tape 1 at a high speed.

In proportion as the tape 1 is wound, the tape running speed is accelerated, so that the rotation number of the drive motor 4 is reduced gradually in order to maintain a constant tape running speed. Furthermore, in proportion as the tape 1 is wound, the rotation number of the supply reel 2 is increased, so that the rotation number of the drive motor 4 is reduced further in order to maintain a constant rotation number of the supply reel. When the rotation number of the drive motor 4 becomes under a predetermined value (for example, 2,000 rpm), the output voltage supplied to the drive motor 4 is switched from a high voltage to a low voltage to reduce the rotation number of the drive motor 4 rapidly, thereby performing the first stage deceleration.

When the tape area of the take-up reel 3 reaches a predetermined value in conformity with the tape amount wound up around the reel, the drive motor 7 is so controlled as to reduce the rotation number further, thereby performing the second deceleration. Subsequently, when the rotation number of the drive motor 4 becomes under a predetermined rotation number (for example, 500 rpm), the third stage deceleration is performed to rotate the drive motor 4 at a lower speed. By performing such stepwise decelerations, the running speed of the tape 1 is reduced while maintaining a tape tension nearly constant and the rewinding of the tape 1 is stopped when a tape end is detected.

In this high-speed tape winding operation, a safer acceleration can be arranged by setting the best acceleration conditions in conformity with the running situation of the tape 1 depending on the tape area calculated during the rotation of the drive motor 4 approximately at a constant speed. For example, in a fast-forward running mode, when the tape 1 is detected as in the state of the beginning of tape winding by calculating the tape area of each of the reels 2 and 3 during the rotation of the drive motor 4 approximately at a constant speed, the drive motor 4 is so controlled by the controller 10 to operate a rapid acceleration mode wherein the drive motor reaches the maximum speed in a short period of time. On the contrary, when the tape 1 is detected as in the state of the end of tape winding, the drive motor 4 is so controlled by the controller 10 to be accelerated gradually.

Figure 3:
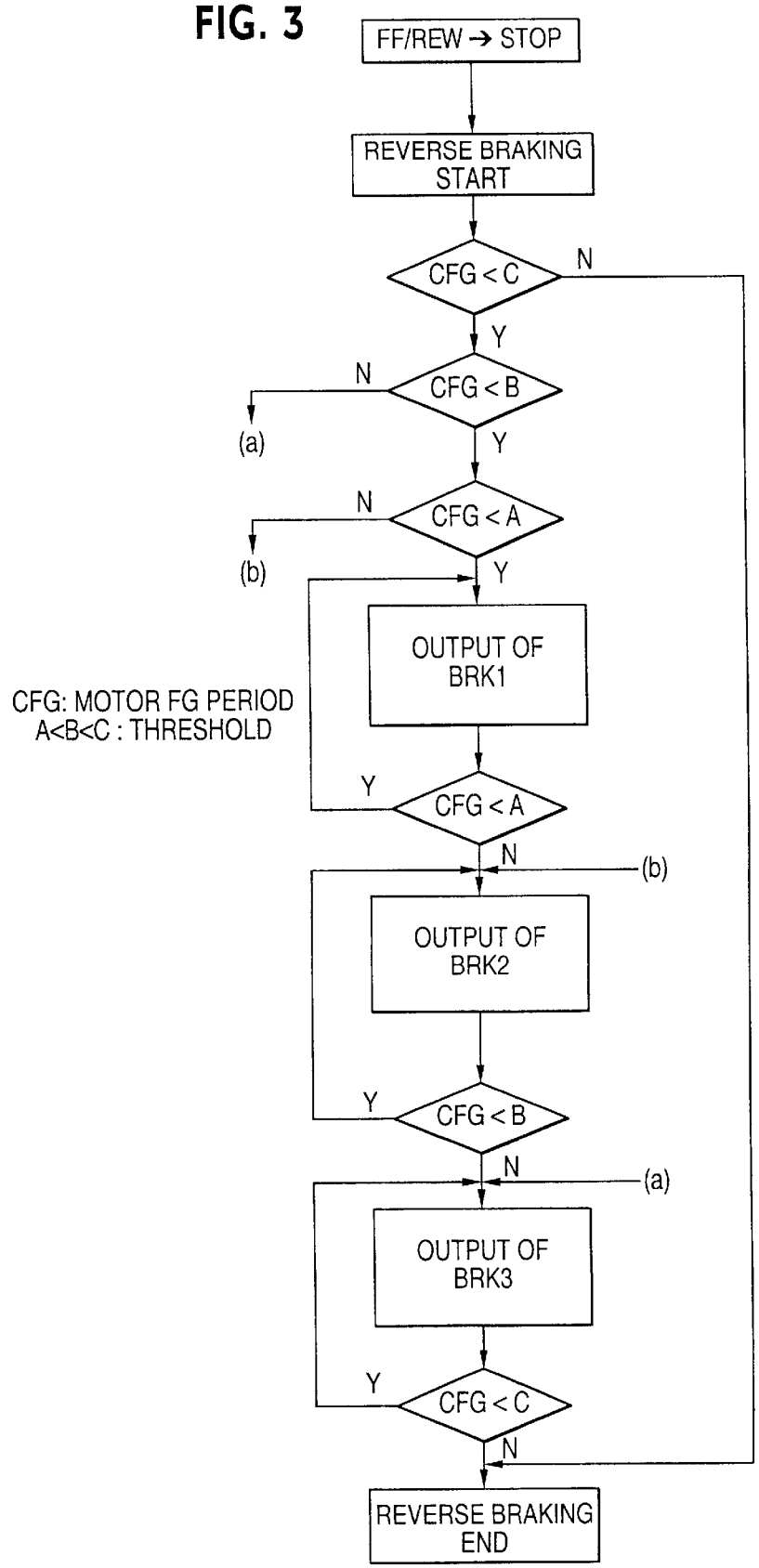
FIG. 3 is a flow chart showing the control of tape stopping during a tape winding at a high speed.
Figure 4:
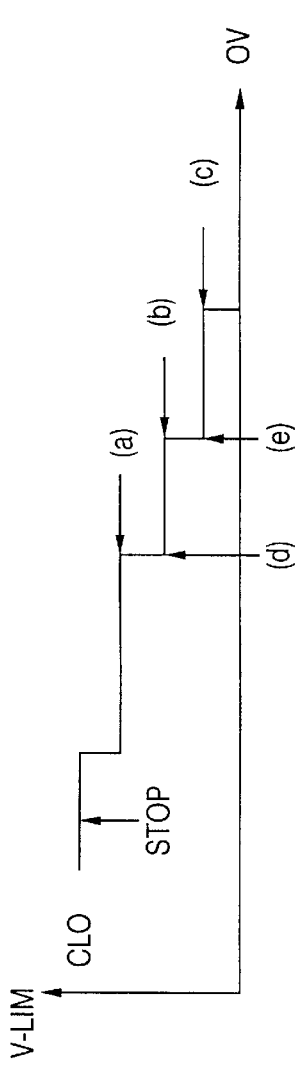
FIG. 4 is a chart showing a reverse braking voltage to be applied during a tape winding at a high speed.
Figure 5:
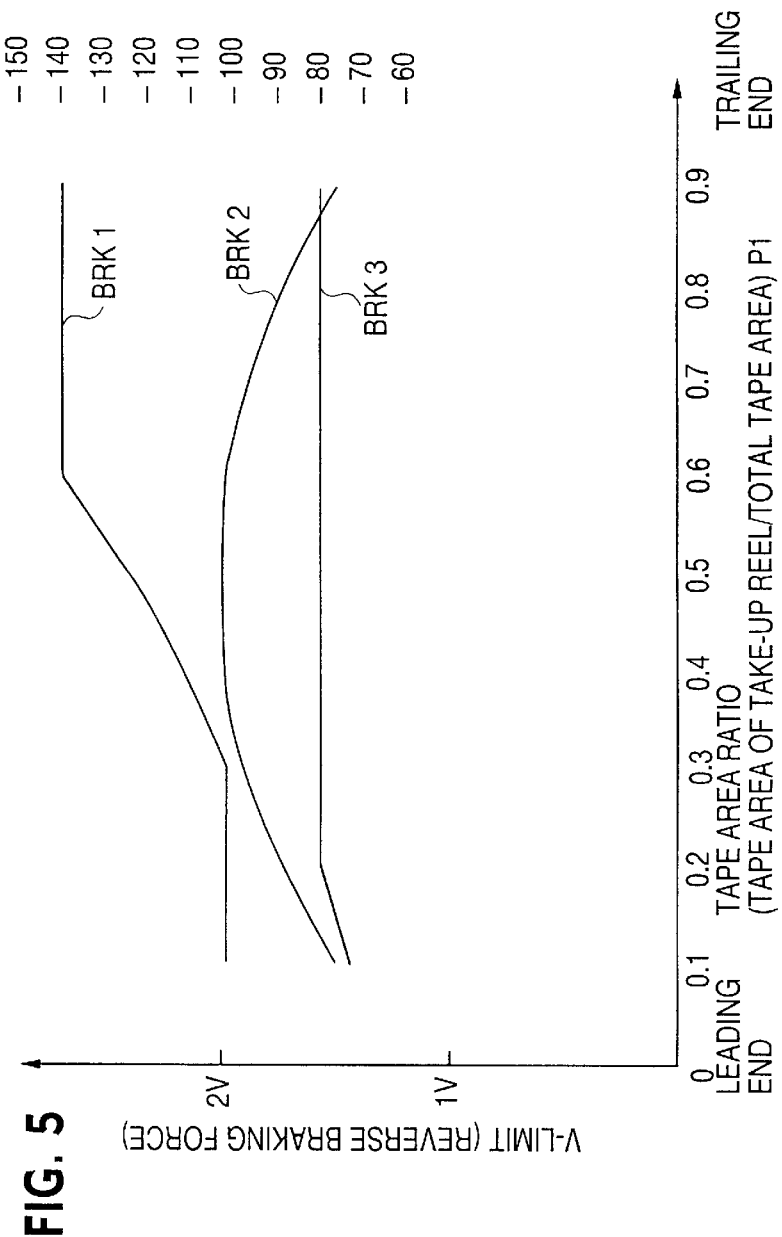
FIG. 5 is a chart showing the relation between the ratio of each tape area and a reverse braking voltage to be applied during a tape winding at a high speed.

Next, control operations wherein a tape stopping key is depressed during the above mentioned high-speed tape winding operation will be explained in connection with FIG. 3 through FIG. 5. FIG. 3 is a flow chart showing the reverse braking operation, FIG. 4 is a chart showing a specified embodiment with respect to the reverse braking force, and FIG. 5 is a graph showing the relation between the ratio of tape area and the reverse braking force.

When a stop command is inputted during a high-speed tape winding operation (FF/REW), the controller 10 controls the driving mechanism of the mechanical braking means 5, 6 regardless of a tape position so as to apply a constant braking force to the reels 2 and 3, and at the same time the reverse braking operation is initiated. The reverse braking operation is performed as follows. First, a FG period is calculated by detecting frequency signals of the drive motor 4, and then the calculated value (CFG) is compared with three thresholds (A<B<C). In accordance with the calculated value, a different reverse braking force (for example, three kinds of reverse braking force) is outputted adjusting the reverse braking force in proportion to the reduction of the rotation number of the drive motor 4. And finally, when the rotation number of the drive motor 4 becomes lower than a predetermined rotation number, the reverse braking operation is completed.

For example when a FG period is shorter than a first threshold A, i.e., when the rotation number of the drive motor 4 is higher than a rotation number corresponding to the threshold A, a first reverse braking force (BRK1) calculated based on the equation (1) described hereunder is outputted. When a FG period is longer than the first threshold A and shorter than a second threshold B, i.e., when the rotation number of the drive motor 4 is lower than a rotation number corresponding to the threshold A and higher than a rotation number corresponding to the threshold B, a second reverse braking force (BRK2) calculated based on the equation (2) described hereunder is outputted. Likewise, when a FG period is longer than the second threshold B and shorter than a third threshold C, i.e., when the rotation number of the drive motor 4 is lower than a rotation number corresponding to the threshold B and higher than a rotation number corresponding to the threshold C, a third reverse braking force (BRK3) calculated based on the equation (3) described hereunder is outputted. And when a FG period becomes longer than a third threshold C, i.e., when the rotation number of the drive motor 4 is lower than a rotation number corresponding to the threshold C, the reverse braking operation is terminated.

The equations (1), (2) and (3) are as follows.

$$BRK1 = K1/(\text{a total tape area} \times \text{rotation number of a drive motor}) \quad \text{Equation (1)}$$

wherein the rotation number of a drive motor is a rotation number immediately before applying a reverse braking force, and K1 represents an arbitrary constant.

$$BRK2 = (K2 - K3(P1-0.5)^2)/\text{a total tape area} \quad \text{Equation (2)}$$

wherein K2 and K3 represent an arbitrary constant; P1=a tape area of take-up reel/a total tape area having a value between 0.00 and 1.00; and the tape area of a take-up reel is a value at the time when a tape stop command is inputted.

$$BRK3 = (K4 - K5(P1-0.6)^2)/\text{a total tape area} \quad \text{Equation (3)}$$

wherein K4 and K5 represent an arbitrary constant.

In the equation (1), the reverse braking force BRK1 is set to be in inverse proportion to a total tape area because of the following reasons. In case of a tape having a large total area, at the initial stage of tape winding starting either from a tape leader or a tape trailer, the tape area of the supply reel is larger than that of a take-up reel. In other words, the rotational inertia of the supply reel is larger than that of the take-up reel. If a strong reverse braking force is applied under such conditions, the take-up reel is stopped earlier than the supply reel, thus resulting in a tape protrusion from the supply reel. For preventing such problems, the reverse braking force is applied in inverse proportion to a total tape area. Also in the equations (2) and (3), the reverse braking force is set to be in inverse proportion to a total tape area.

The reverse braking force BRK1 is set to be in inverse proportion to the rotation number of the drive motor 4 because of the following reasons. As shown in FIG. 2, in a high-speed tape winding operation, the rotation of a drive motor is so controlled as to reach the maximum speed at a leading end portion of a tape and is decelerated gradually after a medium portion of a tape. At the time when the drive motor rotates at its maximum speed, the tape area of the supply reel, i.e., the rotation inertia of the supply reel is large. Accordingly, when a strong reverse braking force is applied, the take-up reel having a small tape area, i.e. a small rotational inertia is stopped immediately, thereby causing a tape protrusion from the supply reel. For solving such problems, the first stage reverse braking force is applied in inverse proportion to the rotation number of the drive motor.

The relation between the reverse braking force and the tape area of the take-up reel is as follows. In the high-speed tape winding operation as shown in FIG. 2, in proportion as the tape area of the take-up reel becomes larger, the take-up reel is controlled to decelerate. Accordingly, where the reverse braking force BRK1 is considered in relation with the tape area of the take-up reel instead of a rotation number of a drive motor in the equation (1), it may be said that BRK1 is set to be in proportion to the tape area of the take-up reel.

In the equations (2) and (3), a negative quadratic function term, such as "$(P1-0.5)^2$" or "$(P1-0.6)^2$" related to a tape area ratio of the take-up reel is included, so that the reverse braking force is reduced at both the leading end and the trailing end of the tape, thereby avoiding the occurrence of squeaking derived from idler gears or the like.

In the tape area ratio of the take-up reel, "$P1=0.5$" denotes the medium portion of the tape, while "$P1=0.1$" is the trailing end and "$P1=0.9$" is the leading end. Accordingly, the value of $(P1-0.5)^2$ or $(P1-0.6)^2$ becomes the largest at the leading end and the trailing end of the tape. Said values being the negative quadratic function terms in the equations (2) and (3), each value of the reverse braking force BRK2 and BRK3 becomes smaller by getting near to the leading or trailing end of the tape, thereby reducing the reverse braking force.

When a strong reverse braking force is applied at the leading end portion of the tape wherein the tape area of the take-up reel is small, it is likely that a drive motor is decelerated earlier than a reel. On the other hand, when a strong reverse braking force is applied at a trailing end portion of a tape wherein the rotation number of a drive motor becomes small, it is likely that a drive motor is decelerated earlier than a reel. In both cases, an idler gear engaged with a reel is flipped by the reel, thereby causing squeaking. For avoiding such drawbacks, the second and third stage reverse braking force are decided by taking into account of a tape area ratio.

In this invention, the total area of the tape 1 is the sum of the hub area of both reels 2, 3 and the area of the tape wound around the reels, and the tape area of a reel is the sum of the hub area and the area of a tape wound around the respective reel. The sum of the tape area of the supply reel and the tape area of the take-up reel equals to the total area of the tape.

The calculation of the total tape area utilizes the result of the total tape area calculation made immediately after starting the high-speed tape winding. Namely, immediately after starting the high-speed tape winding, a driving mechanism is shifted so that the tape 1 is transported by the pinch roller 13 and the capstan 11. The drive motor 4 is rotated approximately at a constant speed and the tape 1 is transported slowly with the reels 2, 3 rotating. After a predetermined period of time, reel pulses and frequency signals are detected during the tape running at a constant speed and inputted into the controller to calculate the total tape area, and the total area of the tape 1 thus calculated is memorized in the controller. Said memorized total tape area is utilized here.

The calculation of the total tape area may be made as follows. The rotation number of each reel is calculated based on the count number of reel pulses, the tape running amount being calculated based on the count number of frequency signals, the respective radius of the reels 2 and 3 being calculated based on the rotation number of each reel, the tape running amount and the respective tape area of the reels 2 and 3 being calculated, and the total tape area is calculated. The total tape area may be also calculated based on the circumference of the tape area of the reels 2 and 3 calculated from the count number of the frequency signals and a standard tape speed.

The calculation of the tape area is made as follows. A rotation ratio between the reels is determined based on the count value of the frequency signals at the time when a predetermined reel pulse is counted at the reels 2 and 3, and then each tape area is determined. During high-speed tape running, said reel pulse is constantly counted in order to determine the rotation ratio of the reels 2, 3, thereby calculating the respective tape area.

As shown in FIG. 4, the first reverse braking force BRK1, the second reverse braking force BRK2 and the third reverse braking force BRK3 have the relation of BRK1>BRK2>BRK3, and the reverse braking force is shifted in turn to the lower one in proportion to the reduction of the rotation number of the drive motor 4.

FIG. 4 is a chart showing the reverse braking force operation showing a V-Limit terminal voltage on the ordinate and the period on the abscissa, wherein the reverse braking force BRK1, BRK2 and BRK3 is shifted in turn. In the drawing, (a), (b), (c) represent the braking force of BRK1, BRK2 and BRK3, respectively. (d), (e) represent shifting points. The reverse braking force is shifted, as already described, gradually in proportion to the reduction of the rotation number of the drive motor 4. For example, the reverse braking force is shifted from BRK1 to BRK2 at the rotation number of 2450 rpm, and shifted from BRK2 to BRK3 at the rotation number of 2000 rpm. The shifting points may be altered depending on the fast-forward running mode and rewinding running mode.

The reverse braking force is controlled by applying voltage ranging from 0 to 5 volts to the V-Limit terminal of the drive motor 4. In this case, the level of the reverse braking force may be controlled by applying digital data obtained by dividing 5 volts into 256 stages.

However, when the voltage applied to the V-Limit terminal is excessively low, e.g., 1.25 volts or below, the reverse braking force becomes so small as to be almost useless. Then a lower limit value is set so as not to be excessively low. On the other band, when the voltage applied to the V-Limit terminal is excessively high, e.g., 2.8 volts or over, an excessive load is applied to a drive IC of the drive motor 4, thereby causing a destruction of said drive IC. Then an upper limit value is also set.

FIG. 5 is a diagram for the reverse braking force, in which the V-Limit terminal voltage is shown on the left-side ordinate and a tape area ratio PI of a take-up reel is shown on the abscissa. And for reference, control digital values (60–150) are shown on the right-side ordinate. An upper limit is set for the reverse braking force BRK1.

In the preferred embodiments described heretofore, since three types of reverse braking force controllable with a microcomputer are applied to the drive motor for rotating the reels in addition to the mechanical braking means and besides a lower reverse braking force is outputted in proportion to the reduction of the rotation number of the drive motor, the rotation inertia of the drive motor and the rotation inertia of the reels can be diminished. Thus, a safe and constant braking operation can be performed without seeking for a strict operation timing and precision of the mechanical braking means.

Especially, since the reverse braking force is variable and determined using a calculation equation related to the tape conditions, i.e., a total tape area, a tape area of the take-up reel, a rotation number of a drive motor or the like, the best reverse braking force is applied without causing squeaking or tape damages.

Although the present invention has been described and illustrated with a certain degree of particularity, it is understood that one skilled in the art will recognize a variety of additional application and appropriate modifications within the spirit of the present invention and scope of the claims.

For example, in the above described preferred embodiments, the value of the outputted reverse braking force is calculated based on the rotation number of the drive motor and the tape area ratio at the time when a stop command is inputted. The reverse braking force, however, may be controlled so as to be shifted in proportion to each value of the rotation number of the drive motor and the tape area. Besides, the above described equations (1), (2) and (3) are only for examples, and appropriate modifications to such equations may be made.

As will be apparent from the description hereinbefore, since the reverse braking force is applied to the drive motor for rotating the reels depending on the tape conditions in addition to the mechanical braking means for diminishing the rotational inertia of the drive motor and braking the take-up reels, a safe and constant braking operation can be performed without seeking for a strict operation timing and precision of the mechanical braking means.

What is claimed is:

1. A tape stopping mechanism comprising a supply reel for supplying a tape, a take-up reel for winding a tape, a drive motor for rotatively driving said take-up reel, a rotation detecting means for detecting a rotation number of the drive motor, and a controller for performing a stopping operation of tape running in a fast-forward running mode or a rewinding running mode by means of a reverse braking force generated by applying a reverse voltage to the drive motor, the controller setting the reverse braking force depending on the rotation number of the drive motor detected by the rotation detecting means.

2. A tape stopping mechanism as claimed in claim 1, wherein the controller controls the reverse braking force so as to reduce the braking force in proportion to the reduction of the rotation number of the drive motor.

3. A tape stopping mechanism as claimed in claim 2, wherein the controller controls the reverse braking force so as to be set the braking force stepwise depending on the rotation number of the drive motor.

4. A tape stopping mechanism as claimed in claim 3, wherein the controller controls the reverse braking force of three stages from a first stage to a third stage depending on the rotation number of the drive motor and controls the drive motor by the reverse braking force depending on the rotation number of the drive motor detected by the rotation detecting means and controls the reverse braking force so as to be reduced stepwise depending on the reduction of the rotation number of the drive motor.

5. A tape stopping mechanism as claimed in claim 1, further comprising a detecting means for detecting a total tape area of the reels, and the controller sets the reverse braking force in inverse proportion to the total tape area of the reels.

6. A tape stopping mechanism as claimed in claim 4, further comprising a detecting means for detecting a tape area of the take-up reel, and the controller sets the first stage reverse braking force in proportion to the tape area of the take-up reel.

7. A tape stopping mechanism as claimed in claim 6, wherein the controller sets the first stage reverse braking force in proportion to the tape area of the take-up reel and the rotation number of the drive motor.

8. A tape stopping mechanism as claimed in claim 4, further comprising a detecting means detecting the total tape area and the tape area of the take-up reel, the controller calculating a ratio of the tape area of the take-up reel to the total tape area and reducing the reverse braking force at a leading end and a trailing end of the running tape depending on the calculated value of the ratio.

* * * * *